March 3, 1953  W. O. MARTIN  2,630,194
RAILROAD BRAKE SLACK ADJUSTER
Filed May 13, 1949  2 SHEETS—SHEET 2

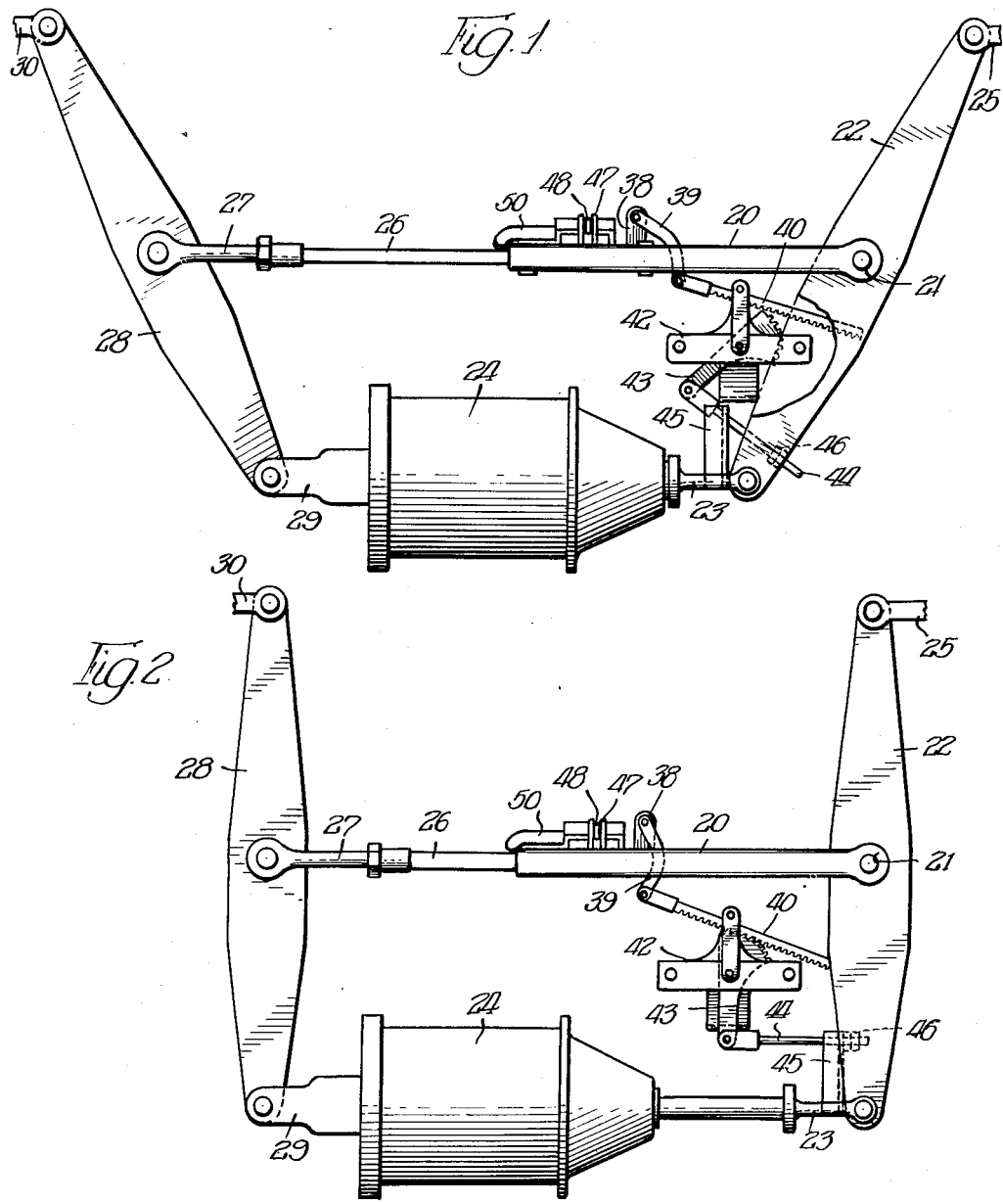

INVENTOR.
William O. Martin.
BY

Patented Mar. 3, 1953

2,630,194

UNITED STATES PATENT OFFICE 2,630,194

RAILROAD BRAKE SLACK ADJUSTER

William O. Martin, Fort Smith, Ark.

Application May 13, 1949, Serial No. 93,161

1 Claim. (Cl. 188—200)

My invention relates more particularly to automatic slack adjusters for the brakes of locomotive tenders and/or the brakes of railroad freight cars whereby undue play or slack in the brake applying mechanism will be automatically taken up or adjusted in order that the same and desired brake force or braking pressure may be provided and substantially equal piston travel of the respective brake cylinders obtained with mechanically operated slack adjuster mechanism.

As the respective brake cylinders receive substantially the same amount of compressed air, it is apparent that a lesser brake applying pressure is obtained by a longer traveling piston (for example as is caused by worn brake shoes) than is the case with a piston requiring a shorter travel to effect brake application and as a result unequal braking force would be applied to cars having unequal piston travels. The serious conditions resulting from such unequal brake application are too well known to require recitation.

It often is more desirable and convenient to adjust the brake cylinder piston travel by varying the length of the rod connection between the brake cylinder lever and the floating, equalizing and/or dead lever, than by making the adjustment at other possible points of the brake-rigging.

My invention relates to automatic slack adjusters involving telescopically arranged tie members between the live brake lever and the dead or floating brake lever and adapted, during operation of the cylinder piston push rod, to move into greater telescopic relation, during slack take-up operation. In slack adjusters of this type, the operative relation between the cylinder piston push-rod and the collapsible brake lever tie members operating means automatically changes upon release of the brake levers. As a result, undesirable operation of the slack adjuster is effected during all subsequent normal piston push-rod operations without my invention.

My present invention is designed to overcome this unwanted operation by providing tie member operating mechanism which automatically releases its operative relation with the piston push-rod during the brake lever return stroke and provides a uniform moment of operation when the piston push-rod travels beyond a predetermined extent during subsequent operations, due to brake shoe wear or wear in other elements of the brake rigging. That is to say, my present invention permits the normal travel of the piston push-rod during all brake application operations, without actuating the slack take-up mechanism except when the piston push-rod travel exceeds the predetermined normal travel.

The objects and advantages of my invention will be readily comprehended from the following detailed description of the accompanying drawings wherein—

Figure 1 is a top plan view of my improved slack adjuster as applied to a locomotive tender, the usual type of freight cars, flat cars or gondola cars at present in use, with the mechanism in brake released condition.

Figure 2 is a similar view with the mechanism in brake applying and slack take-up condition.

Figure 3:
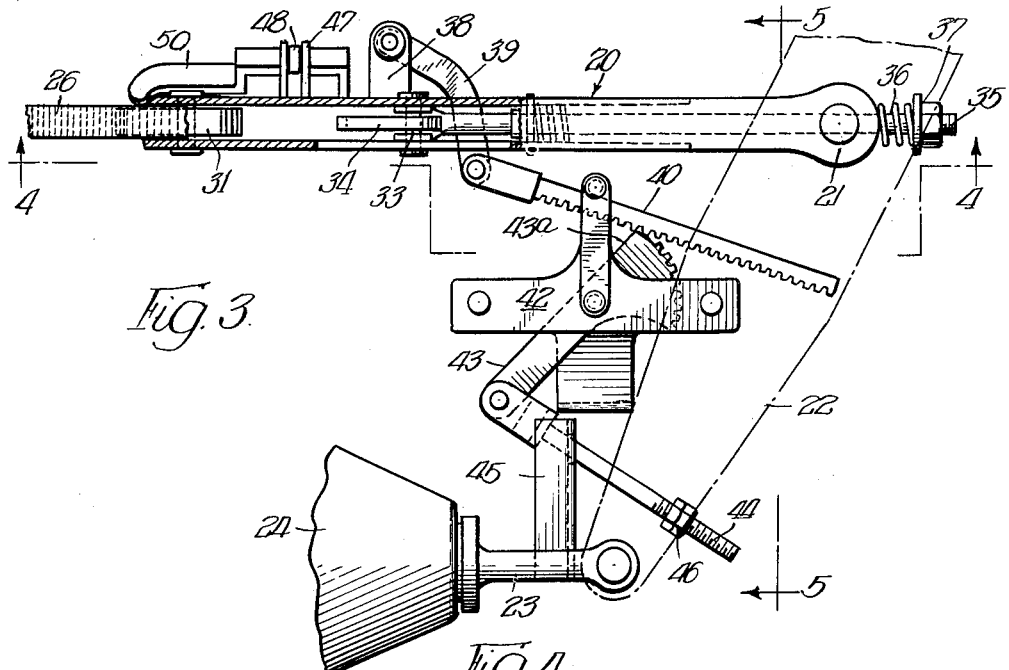
Figure 4:
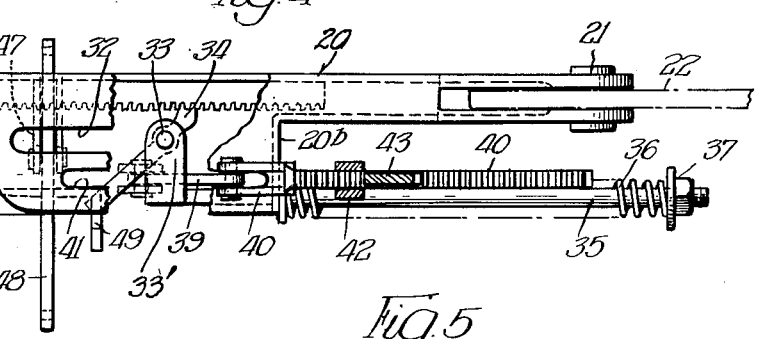

Figure 3 is a top plan, on a somewhat larger scale, with the mechanism as shown in Figure 1; the cylinder live lever being shown in dotted lines and the dead or floating lever and adjacent end of the tie between the two levers omitted and the housing of the tie in longitudinal section at the left hand end with the rack bar broken away. Figure 4 is a sectional view taken substantially on the line 4—4 of Figure 3.

Figure 5:
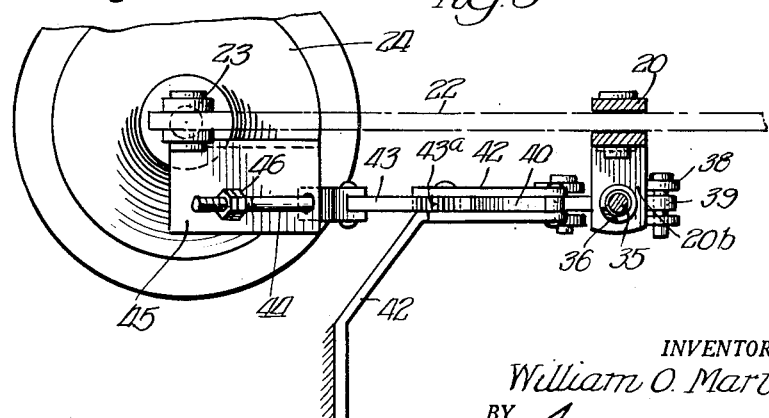

Figure 5 is a sectional view taken on the line 5—5 of Figure 3.

The exemplification of my improved brake slack adjuster involves an elongated open ended housing 20 provided with a fork or apertured extension 21 for pivotally securing it to the cylinder live lever 22 whose one end is pivotally connected to the piston rod 23 of the brake cylinder 24, while the other end of the lever 22 is pivotally connected to the rod of the brake rigging as shown at 25. The housing 20 is provided with a slidable rack bar 26, adapted to move inwardly through the left hand open end of the housing and its outer end enlarged for receiving the connecting rod 27 which is pivotally connected to the dead or floating lever 28 as shown in Figures 1 and 2. One end of lever 28, in the particular exemplification, is pivotally connected to a bracket 29 secured on the pressure head of the cylinder 24; while the other end of lever 28 has the top rod of the brake rigging pivotally secured thereto as shown at 30.

As shown, the housing 20 and the rack bar 26 constitute an extensible and regulable tie means between the live lever 22 and dead or floating lever 28; regulation being accomplished by mechanism to be described.

The housing at one end is provided with side wall portions 20ª, see Figure 4, between which a counterweighted pawl or detent 31 is pivotally mounted, while its inner toothed end normally remains in engagement with the teeth of rack bar 26. The housing side walls 20ª are provided with the longitudinally extending slot 32 to receive the pin 33 for pivotally supporting the counterweighted actuating pawl 34 whose upper toothed end is arranged in mesh with rack bar 26 and causes the latter to move inwardly of the housing 20 when occasion for slack take-up arises; while detent 31 holds the adjusted relation between the housing and rack bar and prevents outward sliding movement of the rack bar. The pin 33 also has the inner end of a rod 35 operatively connected therewith; the rod extending through the end wall 20b of the housing and the outer end of the rod provided with a suitable coil spring 36. The outer end of rod 35 preferably is threaded to receive a washer and nut as at 37 whereby the spring 36 is compressed against the end wall 20b and the tension controlled and a constant pressure on rod 35 exerted which tends to shift pin 33 with actuating pawl 34 forwardly or toward the right in Figure 4. The housing 20 (on the side disposed away from the cylinder 24) is provided with a bracket 38 to which one end of an arcuate lever 39 is pivotally secured, while the other end of lever 39 has one end of a rack rod 40 pivotally secured thereto. The arcuate lever 39 passes through a slot 41 in the walls 20a of the housing in advance of the pawl 34 carried by the inner end of the spring rod 35.

The rack rod 40 passes slidably through a yoke or guide portion of a bracket 42 which is fixedly secured to a stationary portion of the car underframe or side sill. This bracket 42 also provides means for pivotally mounting the oscillative sector like lever 43, the sectoral portion whereof is toothed at 43a to mesh with the rack rod 40 when the cylinder push-rod 23 travels beyond a predetermined degree. The opposite end of lever 43 has a pull rod 44 pivotally secured thereto. The pull rod 44 extends loosely through a suitable opening in the upper end of an arm 45 which is suitably attached to the piston push rod 23; and the outer end of the pull rod 44 is shown threaded and provided with nuts 46 adjusted lengthwise of the rod where they will not be engaged by the push rod arm 45 until the piston push rod 23 of the cylinder 24 has moved outwardly beyond its normal or predetermined limit.

The housing 20, adjacent its left hand end, is provided with a bracket at 47 for pivotally mounting the transversely disposed release lever 48 which is provided with the laterally disposed arms 49, 50, whose ends are formed to engage with and to tilt the pawl 34 and detent 31, respectively, out of holding engagement with the rack bar 26 and permit the live or cylinder lever 22 and the floating or dead lever 28 to move to normal position and to become lengthwisely extended to permit brake shoe replacement.

The principal object of my invention is the provision of mechanism wherein the operative relation between the brake cylinder push rod and the telescopic contractible tie controlling means is not altered during slack take-up operations and undesired take-up movement effected during subsequent brake applications or normal outward travel of the brake cylinder push rod. I therefore provide a self releasing power imparting mechanism wherein the predetermined moment of operation during outward travel of the piston rod will continue to be uniform.

In Figure 1 the brakes are released; the brake levers 22 and 28 and the piston push-rod 23 are in retracted or non-brake applying position, with the toothless part of sector 43a in disengagement with rack bar 40. This condition maintains during normal brake applying operations. In the event of wear the piston push-rod 23 will travel beyond its desired or normal travel, shown in Figure 2, causing the piston push-rod arm 45 to engage the previously adjusted nuts 46 thereon and induce the pull-rod 44 to travel with the piston push-rod through the action of arm 45. This movement of the pull-rod 44 will rotate sector lever 43 and cause its teeth to mesh with rack bar 40 and move the latter to the left in Figure 1 which in turn swings arcuate lever 39 to the left thereby engaging head 33' carrying the pivotal connection 33 and pawl 34, and forces the pawl carrying rod 35 to the left against the action of its spring. This inward movement of the rod 35 and the pawl 34 induces the latter to engage teeth of rack bar 26 inward or to the left of the teeth originally engaged, with the result when the brakes are released the brake levers 22 and 28 will cause increased telescopic relation of the housing 20 and rack bar 26, through the action of spring 36 on the pawl-carrying rod 35 to an extent sufficient to take up the slack.

Upon release of the brakes, the live brake lever 22 and the piston push-rod 23 with its striker arm 45 will return to their normal positions shown in Figures 1 and 3, which rotates sector lever 43 and moves its teeth out of mesh with rack rod 40—which latter, however, has moved somewhat to the left in the drawings, causing the teeth of sector lever 43 to mesh with teeth on rack rod 40 farther to the right when the next slack take-up operation occurs. As is apparent, the piston push-rod 23 may, during subsequent brake applying operations, travel its predetermined normal distance without inducing operation of the slack adjuster mechanism. It will be noted that the power imparting mechanism intermediate the cylinder, piston push-rod arm and the collapsible tie between the brake levers maintains a fixed relation to the piston push-rod and hence no operation thereof occurs during ordinary brake application until slack in the brake mechanism occurs.

The exemplification is believed to be the best embodiment of the invention, but structural modifications may be made without, however, departing from the spirit of my invention as defined in the appended claim.

What I claim is:

A brake slack adjuster comprising, in combination with a brake cylinder push rod, the live lever and the floating lever of a railroad car brake rigging, a telescopic tie connection between the levers and pivotally connected therewith, said tie connection adapted to contract in slack take-up operation and consisting of an elongated housing having a fixed pivotal connection at its outer end with the live lever, a rack bar slidable in said housing and pivotally connected at its outer end to the floating lever, a rod disposed longitudinally of and slidably mounted in said housing, said rod being provided with a laterally extending head carrying a pivot pin, a pawl mounted on said pin and arranged in mesh with said rack bar, a spring surrounding and urging the rod in a direction to cause the pawl to move the rack bar into the housing, an oscillative lever pivotally mounted on the housing and contactable with the pawl carrying head to urge the same in a direction to compress the spring, a second pawl pivotally mounted in the housing and in engagement with the rack bar to prevent movement of said bar out of the housing, a rack rod pivotally connected to the oscillative lever, a gear sector having a fixed pivotal point and in meshing relation with the pivotally connected rack rod, and means to oscillate the sector after a predetermined amount of brake wear, said means comprising a rod pivotally connected to the sector and an arm attached to the push rod and slidably receiving the rod.

WILLIAM O. MARTIN.

REFERENCES CITED

The following references are of record in the file of this patent:

UNITED STATES PATENTS

| Number | Name | Date |
|---|---|---|
| 482,040 | Guillement | Sept. 6, 1892 |
| 887,637 | Hibbard | May 12, 1908 |
| 1,114,295 | Sauvage | Oct. 20, 1914 |
| 1,801,854 | Farmer | Apr. 21, 1931 |
| 1,879,668 | Farmer | Sept. 27, 1932 |
| 1,937,683 | Boirault | Dec. 5, 1933 |
| 1,947,405 | Camp | Feb. 13, 1934 |